Feb. 24, 1970
F. S. GAETA
3,496,762
FLOW-TYPE VISCOSIMETER
Filed Nov. 14, 1966
3 Sheets-Sheet 1
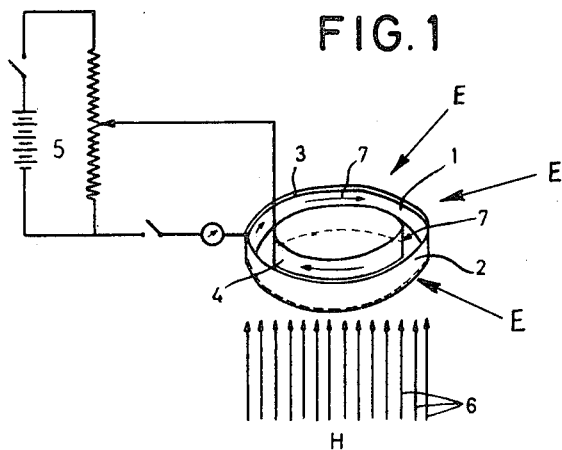
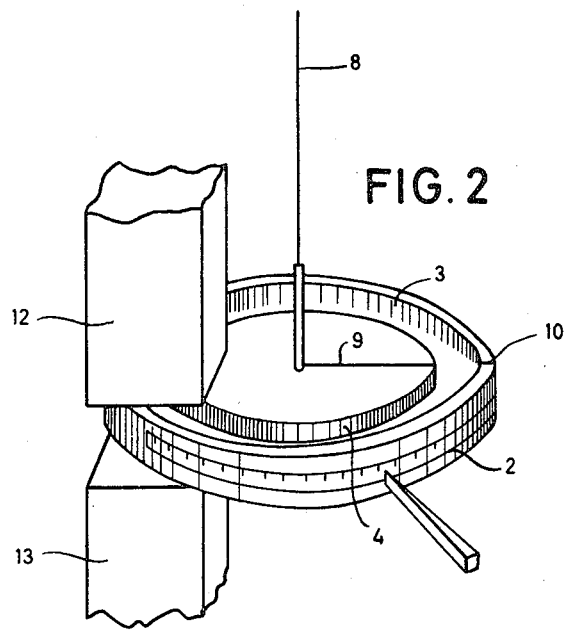
INVENTOR
Francesco Saverio Gaeta
BY Stevens, Davis, Miller & Mosher
ATTORNEYS Feb. 24, 1970  F. S. GAETA  3,496,762
FLOW-TYPE VISCOSIMETER
Filed Nov. 14, 1966  3 Sheets-Sheet 2

INVENTOR
Francesco Saverio Gaeta
BY
Stevens, Davis, Miller & Mosher
ATTORNEYS

United States Patent Office 3,496,762
Patented Feb. 24, 1970

3,496,762
FLOW-TYPE VISCOSIMETER
Francesco Saverio Gaeta, Vomero, Naples, Italy, assignor to European Atomic Energy Community (Euratom), Brussels, Belgium
Filed Nov. 14, 1966, Ser. No. 593,870
Claims priority, application Belgium, Nov. 25, 1965, 672,822
Int. Cl. G01n 11/02
U.S. Cl. 73—54                                                     9 Claims

ABSTRACT OF THE DISCLOSURE

A flow viscosimeter including a horizontal annular channel for containing a conductive liquid. The annular channel has side walls which constitute sole opposed electrodes. A source of constant direct current potential is connected between the electrodes. A magnet is provided for producing a vertical magnetic field passing through the part of the annulus containing the sole opposed electrodes. The liquid is caused to rotate around the annulus as a result of the Lorentz force produced in the liquid by the action of the magnetic field on ions moving between the sole opposed electrodes. The total Lorentz force acting in the liquid in the channel and the velocity of the liquid around the annulus are measured.

---

The invention relates to flow-type viscosimeters and is concerned with a viscosimeter which operates by means of electromagnetic forces.

The main advantage of capillary flow viscosimeters as at present constructed over other types of viscosimeter is that, with flow viscosimeters, the liquid is moved by gravity. This force is applied directly to the liquid without the interposition of any moving mechanical part, so that the whole of the dissipation of energy by friction takes place in the liquid itself. Unfortunately, the gravitational force is too great in relation to the forces produced in the liquid by its viscosity when the latter is one or a few centipoises, as often happens, for example, in the case of high polymers or biological molecules such as DNA. This disproportion between the forces involved produces considerable shear effects which greatly impair the accuracy of measurements. Various kinds of viscosimeter which tend to remedy these disadvantages have recently been developed, e.g. the viscosimeter of Zimm, B.H., and Crothers, D.M., described in the Proc. Natl. Acad. Sci., vol. 48 (1962) pp. 905–911.

None of these instruments entirely satisfies the requirements for measuring the flow of polymeric or biological solutions. It is an object of the present invention to preserve the advantages derived from directly applying the force setting the liquid in motion throughout the whole of its mass, but to add thereto the advantage of being able as desired to adjust the amount of that force down to values of nearly zero.

The invention provides a flow viscosimeter comprising a horizontal annular channel to contain a conductive liquid of which the side walls, or lower parts thereof, over at least part of the annulus, constitute opposed electrodes, means for maintaining a direct current potential between the electrodes, means for producing a vertical magnetic field passing through at least a part of the annulus where there are electrodes whereby the liquid is caused to rotate around the annulus as a result of the Lorentz force produced in the liquid by the action of the magnetic field on the ions moving between the two electrodes, means for determining the total Lorentz force acting in the liquid in the channel and means for measuring the velocity of the liquid around the annulus.

More specifically the invention provides a flow viscosimeter which comprises a horizontal disc made of insulating material and formed with a circular channel whose conductive side walls form electrodes connected to an external direct-current supply, the channel containing the liquid whose viscosity is to be measured, the liquid being wholly or partly situated in a vertical, homogeneous magnetic field so that the liquid is rotated as a result of the Lorentz forces produced in it by the action of the magnetic field on the ions moving between the two electrodes, means also being provided to measure the total force acting on the liquid and the velocity at which the latter rotates.

The invention also provides a viscosimeter as just described modified in that, for use when the liquid whose viscosity is to be determined is non-conductive or it is desired not to produce electrolysis in the liquid, the electrodes covering the side walls of the channel extend from the bottoms of the walls over no more than a part of their height, and the bottom of the channel is filled as far as the top edge of the electrodes with a conductive liquid that is not miscible with and is heavier than the liquid whose viscosity is to be measured, the latter liquid being on top of the conductive liquid.

The invention will be more clearly understood by reference to the accompanying diagrammatic drawings which show only the elements necessary for understanding the invention. In the drawings:

FIGURE 1 is a diagram showing the principle of the invention;

FIGURE 2 shows a perspective view of one of the possible embodiments of the invention;

Figure 3:
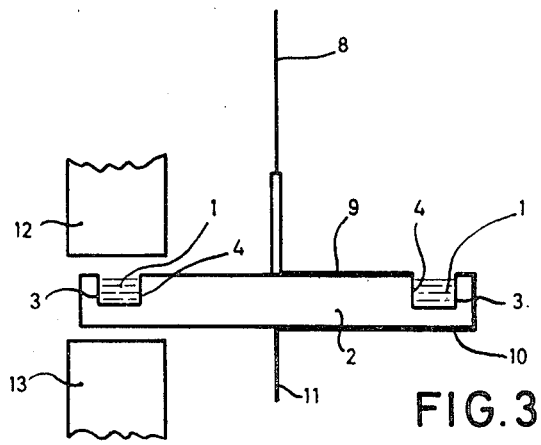
FIGURE 3 shows a section of the viscosimeter in FIGURE 2 through a vertical plane passing through the wire from which the disc is hung.

FIGURE 1 shows a circular channel 1 formed in a disc 2 made of insulating material. This channel 1 contains the conductive liquid whose viscosity is to be determined. The side walls of the channel are made conductive by any per se known method, for example two metal strips 3 and 4.

An electric field E is applied to the liquid by means of the potentiometer device 5 and the metal strips 3 and 4 which act as electrodes.

A magnetic field H forming an angle of 90° with the plane of the free surface of the liquid is applied by means of a magnet; this magnet is not shown in FIGURE 1, but its lines of force 6 are shown. The ions of both signs in the liquid filling the channel 1 move in opposite directions under the influence of the electric field E. The Lorentz force which is applied to them under the influence of the magnetic field H therefore acts in the same direction for the ions of both signs so as to rotate the whole of the liquid in the direction indicated by the arrows 7.

Let I be the strength and J the density of the current passing through the liquid, $J_c$ being the current passing radially through the unit area of the cylindrical surface in the middle of the channel. If $h$ is the level of the liquid layer in the channel, then:

$$J_c = \frac{I}{2\pi rh} = \frac{I}{\pi(R_i + R_e)h}$$

wherein $R_i$ and $R_e$ are the radii of the inner electrode 4 and outer electrode 3 respectively. If $\overline{H}$ is the homogeneous magnetic field, then $$\overline{F}_c = \overline{J}_c \times \overline{H}$$

will be the force acting on the unit volume of the fluid in the centre of the channel, the vector F being normal to the two vectors $\overline{J}$ and $\overline{H}$. Since, as a result of the design $\overline{J}$ and $\overline{H}$ form a right-angle, the following may also be written:

$$|F| = |J| \cdot |H| = \frac{I}{\pi(R_i + R_e)h} \cdot H$$

or, with reference to the forces acting on the ionic charges:

$$|F| = (n_+ e_+ \mu_+ + n_- e_- \mu_-) \cdot |E| \cdot |H|$$

wherein $n_+$ and $n_-$ represent the number of positive and negative particles contained per unit volume of the liquid, $e_+$ and $e_-$ representing their charges and $\mu_+$ and $\mu_-$ their mobilities.

The total force $F_T$ acting on the liquid is the integral of F through the whole of the volume of the liquid in the channel.

The liquid is rotated under the influence of the force $F_T$ at a velocity which increases gradually with time until the energy dissipated per second under the action of the forces due to viscosity is equal to the energy introduced into the system during the same interval of time.

The velocity will, of course, depend on the viscosity of the liquid, so that if the force acting on the liquid and at the same time the velocity at which it rotates are known its coefficient of viscosity can be determined.

FIGURES 2 and 3 show a practical embodiment of a viscosimeter according to the invention.

The disc 2 in which the channel 1 is formed is hung from an electrically conductive torsion wire 8 and connected to one of the terminals of the supply 5 (not shown). The electrode 4 is connected electrically to the conductive wire 8 by means of the conductor 9. The electrode 3 is connected to the other terminal of the supply in a manner similar to that of FIGURE 3 later described.

To sum up, the current from one supply terminal passes through the torsion wire 8, the conductor 9, the electrode 4, the liquid filling the channel 1, the electrode 3, the conductor 10 and thence to the other supply terminal.

In an arrangement of the form just described, the magnetic field should not be applied to the whole surface of the disc; in that case, it would interact with the current passing through the conductors 9 and 10, and the total action of the currents in the liquid and the wires would tend to zero.

Consequently, the two poles 12 and 13 of the magnet producing the magnetic field H only cover the channel sector diametrically opposite to the wires 9 and 10.

The potential difference applied to the electrodes may be varied as desired by means of a potentiometer, e.g. the one shown diagrammatically in FIGURE 1.

After the system has been calibrated, the torsion of the wire 8 due to the drag from the forces of viscosity produced in the rotating liquid to be measured. This torsion is measurable by means of graduations on the disc 2 in combination with a fixed pointer, as shown in FIGURE 2. From this value and the geometric parameters of the system, the coefficient of viscosity $\eta$ of the liquid can be calculated if its velocity of rotation is known. The latter can be determined in a number of ways, two of which will be described.

Figure 5:
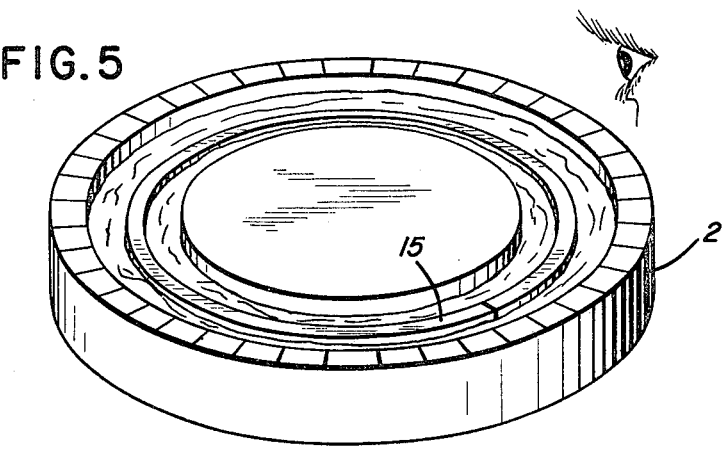
FIGURE 5 shows a perspective view of one velocity measuring means.
Figure 6:
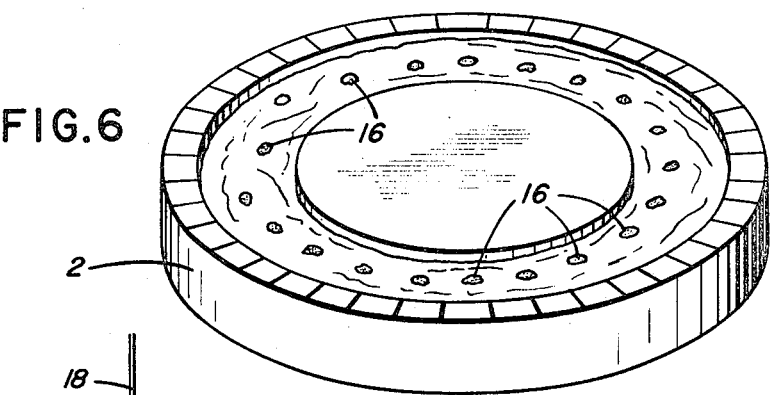
FIGURE 6 shows a perspective view of other velocity measuring means.

For example, a thin, light plastics tube 15, closed on itself in the form of a torus whose radius is equal to that of the centre of the channel 1, may be immersed in the liquid. This torus can be caused just to emerge from the liquid by weighting it with a metal wire whose weight depends on the density of the liquid. The velocity at which this torus rotates gives a good measure of the velocity at which the liquid rotates at its mean radius, and this velocity is readily determined by means of a pointer on the tube 15 as it interacts with a series of graduations on the disc 2. This can be seen in FIGURE 5. Another method is to suspend in the liquid small particles 16 whose velocity is measured. This also enables the distribution of velocities in the liquid for different radii in the channel to be determined. This is shown in FIGURE 6.

Figure 4:
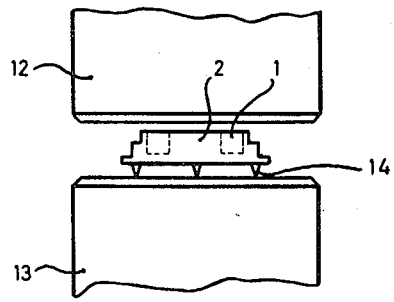
FIGURE 4 shows a side view of another possible embodiment of the invention.

FIGURE 4 shows another possible embodiment of the viscosimeter according to the invention. The magnet, which may be a permanent magnet or an electromagnet, is shown diagrammatically by its two poles 12 and 13, which may be oriented so that the lines of force of the magnetic field are vertical. The disc 2 rests on the horizontal surface of the lower pole piece 13 by means of three precision levelling screws 14, so that it can be disposed in the centre of the interpolar space and made perfectly horizontal. This makes $\overline{J}$ and $\overline{H}$ perfectly orthogonal. The force rotating the liquid in the channel may be determined solely by knowing $\overline{J}$ and $\overline{H}$ precisely. To measure $\overline{J}$ precisely a good microammeter must be used and the polarisation effects at the electrodes must be eliminated. The latter condition may be fulfilled, for example, by using platinum electrodes, or by using a very powerful magnetic field, so that the current density can be reduced to very low values. An advantageous feature of this form of viscosimeter is that the magnetic field acts on the whole volume of the liquid so that the same total force can be obtained for a force per unit volume that is lower than in the preceding embodiment.

Figure 7:
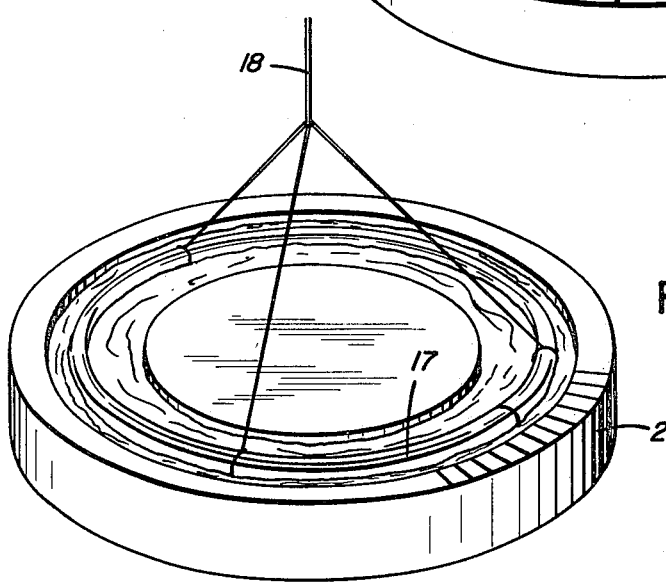
FIGURE 7 shows a perspective view of a third velocity measuring means.

The velocity at which the liquid rotates can be measured by the methods described with reference to FIGURES 2 and 3. This velocity of rotation may also be determined from the torsion applied to a wire 18 from which there is suspended a ring 17 cut, for example, from a thin polystyrene sheet and placed on the surface of the liquid at the centre of the channel. This arrangement enables the velocity of the liquid to be read directly and rapidly by measuring the movement of a pointer, attached to the polystyrene disc, over a scale drawn on the disc 2. This is shown in FIGURE 7.

If the geometric parameters, the force acting on the liquid and its velocity of rotation are known, elementary calculations will give the value of the coefficient of viscosity $\eta$. The foregoing description shows that the force setting the liquid in motion is directly applied to the liquid without the interposition of any mechanical means, and that this force may be varied as desired down to very low values by varying the strength of the current passing through the liquid, or the magnetic field, or both.

The liquid whose viscosity is to be measured may be a good non-conductor, so that the electrolytic currents necessary for the operation of the electromagnetic viscosimeter according to the invention cannot be produced in it. It may also be undesirable to produce electrolysis, for example in a biological solution of macromolecules, in view of the alterations that may take place in the macromolecules themselves.

In such cases, however, the electromagnetic viscosimeter according to the invention can still advantageously be used. If electrolysis is to be avoided the electrodes should not cover the entire heights of the walls of the channel 1 formed in the disc 2, but only their bottoms. In such cases a high-density electrolytic solution is poured into the bottom part of the channel, e.g. until it just fills the part of the latter whose side walls are covered by the electrodes in the arrangement just mentioned. The apparatus is then, as a first stage, brought into operation, whereupon the velocity at which the liquid rotates and the force acting on it are measured. Then, in a second stage, a layer of a non-conductive liquid of known thickness and viscosity is poured on to the solution, and the velocity at which this liquid rotates on the free surface is determined for the same curernt strength as in the first stage. Finally, in the third stage, the top liquid is removed and a layer of the liquid to be tested, having exactly the same thickness, is poured into the channel. The velocity of rotation is again determined on the surface of this layer, the current strength remaining constant.

As the liquids added in stages 2 and 3 do not form part of the electric circuit and the total force setting these liquids in motion has remained the same throughout, the difference between the velocities at which the two liquids rotate is due solely to the variation in the total dissipation of energy due to the viscosity forces in changing from the liquid of stage 2 to that of stage 3.

A comparison of the results obtained with the reference liquid (stage 2) and the liquid to be tested (stage 3) yields a relative value of the coefficient of viscosity sought in relation to that of the other liquid.

This methods of measurement, however, is subject to certain conditions, for example:

The reference liquid and the liquid to be tested must not be miscible with the electrolyte, and The liquid to be tested must not be electrically conductive.

If one of these conditions is not fulfilled, however, a very thin layer of liquid which is non-conductive and non-miscible with the other two may be inserted between the electrolyte and the liquid to be tested.

I claim:
1. a flow viscosimeter comprising a horizontal annular channel for containing a conductive liquid, said annular channel having side walls at least the lower portion thereof, over at least part of the annulus, constituting sole opposed electrodes, means for maintaining a constant direct current potential between said sole opposed electrodes, means for producing a vertical magnetic field passing through at least a part of the annulus containing said sole opposed electrodes whereby the liquid is caused to rotate around the annulus as a result of the Lorentz force produced in the liquid by the action of the magnetic field on ions moving between said sole opposed electrodes, means for determining the total Lorentz force acting in the liquid in the channel and means for indicating the velocity of the liquid around the annulus.

2. A flow viscosimeter according to claim 1, wherein said sole opposed electrodes extend over substantially 360 degrees.

3. A flow viscosimeter comprising a horizontal disc made of insulating material, a circular channel having side walls formed in a surface of said disc, said side walls of said channel over at least a portion thereof being provided with a pair of sole opposed electrodes connected to an external constant direct-current supply, said channel containing a conductive liquid, means for providing a vertical homogeneous magnetic field, the liquid being at least partly situated in said vertical homogeneous magnetic field so that the liquid is rotated as a result of the Lorentz forces produced in it by the action of the magnetic field on the ions moving between the pair of opposed electrodes, means provided to measure the total force acting on the liquid and means for indicating the velocity at which the latter rotates.

4. A flow viscosimeter according to claim 3, wherein said sole opposed electrodes cover the side walls of the channel from the bottoms of said walls over only a part of their height, and the bottom of the channel is filled as far as the top edge of said sole opposed electrodes with a conductive liquid which is not miscible with and is heavier than a liquid whose viscosity is to be measured, the latter liquid being carried on top of the conductive liquid whereby the viscosity of non-conductive liquids and liquids which are not to be subjected to electrolysis may be determined.

5. A flow viscosimeter according to claim 3, wherein said disc is hung by its centre from a conductive suspension wire which may be subjected to torsion, a radially disposed conductor connected between the inner one of said pair of sole opposed electrodes to the suspension wire, the outer one of said pair of sole opposed electrodes being connected by a conductor to a conductive tip attached to the centre of the bottom of the disc, said tip being immersed in a liquid that is a good conductor and connected to a potential other than that of the suspension wire, and wherein said magnetic field is provided by a magnet whose air-gap contains only a sector of the disc and the channel that are diametrically opposite to said radially disposed conductor.

6. A flow viscosimeter according to claim 3, wherein the entire disc is included in the air-gap of a magnet constituting said means for producing said vertical homogeneous magnetic field, the disc resting on the horizontal surface of the lower pole piece of the magnet, the pair of sole opposed electrodes lining the side walls of the channel being connected to the terminals of said constant direct-current supply by means including a device for measuring current.

7. A flow viscosimeter according to claim 3, wherein the means for indicating the velocity includes a thin tube closed on itself in the form of a torus whose radius is equal to that of the centre of the channel, said tube being practically immersed in the liquid whose viscosity is to be determined, the velocity at which the torus rotates indicating the velocity at which the liquid moves in the centre of the channel.

8. A flow viscosimeter according to claim 3, wherein the means for indicating the velocity includes a plurality of small particles suspended in the liquid whose viscosity is to be determined, the velocity at which they move indicating the velocity at which the liquid moves.

9. A flow viscosimeter according to claim 3, wherein the means for indicating the velocity includes means for measuring the torque applied by a thin light ring, the median diameter of which is equal to that of the centre of the channel, at the surface of the liquid, to a suspension wire connected to said ring.

References Cited

UNITED STATES PATENTS

| 2,896,656 | 7/1959 | Allen et al. | 73—56 X |
| 3,238,787 | 3/1966 | Riordan | 73—516 |

LOUIS R. PRINCE, Primary Examiner

JOSEPH W. ROSKOS, Assistant Examiner